(12) United States Patent
Hirata et al.

(10) Patent No.: US 8,888,228 B2
(45) Date of Patent: Nov. 18, 2014

(54) INK JET RECORDING METHOD AND RECORD

(75) Inventors: Shiki Hirata, Shiojiri (JP); Tsuyoshi Sano, Shiojiri (JP); Takayoshi Kagata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 13/315,745

(22) Filed: Dec. 9, 2011

(65) Prior Publication Data

US 2012/0147085 A1 Jun. 14, 2012

(30) Foreign Application Priority Data

Dec. 10, 2010 (JP) ................. 2010-275445

(51) Int. Cl.
| | | |
|---|---|---|
| B41J 2/015 | (2006.01) | |
| C09D 11/40 | (2014.01) | |
| B41M 5/00 | (2006.01) | |
| D06Q 1/10 | (2006.01) | |
| D06P 5/30 | (2006.01) | |
| D06Q 1/00 | (2006.01) | |
| D06Q 1/04 | (2006.01) | |
| C09D 11/322 | (2014.01) | |

(52) U.S. Cl.
CPC ............ *B41M 5/0023* (2013.01); *C09D 11/40* (2013.01); *D06Q 1/10* (2013.01); *D06P 5/30* (2013.01); *D06Q 1/00* (2013.01); *D06Q 1/04* (2013.01); *C09D 11/322* (2013.01); *B41M 65/0047* (2013.01)
USPC ............................................. 347/20

(58) Field of Classification Search
USPC .......................................... 347/20
See application file for complete search history.

(56) References Cited

U.S. PATENT DOCUMENTS

| | | | |
|---|---|---|---|
| 4,933,212 A | * | 6/1990 | Gerstner et al. ............... 427/258 |
| 5,474,603 A | * | 12/1995 | Miyashita et al. .......... 106/31.33 |
| 6,224,190 B1 | | 5/2001 | Sato et al. |
| 6,443,058 B1 | * | 9/2002 | Stadler et al. .................... 101/23 |
| 7,763,108 B2 | | 7/2010 | Oyanagi et al. |
| 2009/0244168 A1 | * | 10/2009 | Kakutani ......................... 347/21 |
| 2010/0119786 A1 | * | 5/2010 | Kagata et al. .............. 428/195.1 |
| 2010/0177131 A1 | * | 7/2010 | Yoshida ............................. 347/5 |

FOREIGN PATENT DOCUMENTS

| | | |
|---|---|---|
| JP | 11-221933 A | 8/1999 |
| JP | 2002-067355 A | 3/2002 |
| JP | 2008174712 A | 7/2008 |

* cited by examiner

*Primary Examiner* — Alessandro Amari
*Assistant Examiner* — Michael Konczal
(74) *Attorney, Agent, or Firm* — Nutter McClennen & Fish LLP

(57) ABSTRACT

An ink jet recording method includes forming a first image by applying by an ink jet method a glitter ink in which a glitter pigment is dispersed to a first region of a recording medium in which the glitter first image is to be formed, and forming a second image by applying by an ink jet method a color ink containing a coloring material to a second region of the recording medium in which the colored second image is to be formed, the amount per unit area of the glitter ink ejected in an overlapping region in which the first region overlaps the second region being smaller than the amount per unit area of the glitter ink ejected in the first region excluding the overlapping region.

20 Claims, 2 Drawing Sheets

INK JET RECORDING METHOD AND RECORD

Priority is claimed under 35 U.S.C. §119 to Japanese Application No. 2010-275445 filed on Dec. 10, 2010, is hereby incorporated by reference in its entirety.

BACKGROUND

1. Technical Field

The present invention relates to ink jet recording methods and records.

2. Related Art

Demands have recently been increasing for glitter images recorded on the recording surface of media. Known methods for forming glitter images include a hot stamping method in which a record is produced by pressing a metal foil against a recording medium having a highly flat recording surface, a vacuum deposition method in which a metal or the like is deposited in vacuum onto a plastic film having a flat recording surface, and a method in which a glitter pigment ink is applied to a recording medium and the medium is subjected to pressing.

An ink jet recording method is also known in which an ink jet image is recorded by ejecting an ink containing a glitter pigment (hereinafter, also referred to as glitter ink) (see, for example, JP-A-2008-174712). Recording methods using such a glitter ink are advantageous in that glitter images can be formed simply and various images can be produced easily.

Images that are recorded using a glitter ink (metallic images) show metallic glossiness immediately after being printed. However, the images become discolored and the glitter (glossiness) decreases more quickly than images produced using general color inks. Further, the decrease in glitter is more noticeable to human eyes than the discoloration of usual color inks. A possible approach to prevent a decrease in glossiness is for a glitter ink to contain additives that are effective in preventing the discoloration of glitter pigments, such as discoloration inhibitors and UV absorbers. However, some of the discoloration inhibitors are not desirable from the viewpoints of safety and environmental friendliness. Further, some additives can cause marked changes in properties of the ink in a short time. Furthermore, many of the additives do not produce desired effects.

SUMMARY

An advantage of some aspects of the invention is that an ink jet recording method is provided which can record (produce) images having excellent glitter and ozone gas resistance (hereinafter, referred to as gas resistance) while reducing the usage amount of a glitter ink. Another advantage of some aspects of the invention is that a record is provided in which an image having excellent glitter and excellent gas resistance is recorded.

These and other advantages are achieved by the invention described below.

An ink jet recording method according to an aspect of the invention includes forming a first image by applying by an ink jet method a glitter ink in which a glitter pigment is dispersed to a first region of a recording medium in which the glitter first image is to be formed, and forming a second image by applying by an ink jet method a color ink containing a coloring material to a second region of the recording medium in which the colored second image is to be formed, the amount per unit area of the glitter ink ejected in an overlapping region in which the first region overlaps the second region being smaller than the amount per unit area of the glitter ink ejected in the first region excluding the overlapping region.

The ink jet recording method according to this aspect can record (produce) images having excellent glitter and gas resistance.

In the ink jet recording method, it is preferable that the amount of the glitter ink ejected in the overlapping region be varied in accordance with the kind of the coloring material in the color ink.

In this manner, images having excellent glitter and gas resistance as well as high color properties can be recorded (produced).

In the ink jet recording method, it is preferable that the relationship $1.00 < X/Y \leq 3.00$ be satisfied wherein X is the amount [%] of the glitter ink ejected in the first region excluding the overlapping region that is calculated as duty by Equation (1) below, and Y is the amount [%] of the glitter ink ejected in the overlapping region that is calculated as duty by Equation (1) below:

$$\text{duty}(\%) = \text{number of actual recording dots}/(\text{vertical resolution} \times \text{horizontal resolution}) \times 100 \quad (1)$$

(wherein in Equation (1), "number of actual recording dots" refers to the number of actual recording dots per unit length, and "vertical resolution" and "horizontal resolution" each refer to the resolution per unit length).

In this manner, it is possible to prevent more effectively the decrease in glitter of the whole image including the portion of the image in the overlapping region, as well as to achieve particularly excellent gas resistance for the whole image.

In the ink jet recording method, it is preferable that the duty calculated by Equation (1) of the glitter ink in the first region excluding the overlapping region be 30% to 100%.

In this manner, the image produced in the first region excluding the overlapping region achieves particularly excellent glitter and gas resistance.

In the ink jet recording method, it is preferable that the duty calculated by Equation (1) of the glitter ink in the overlapping region be 20% to 80%.

In this manner, the image produced in the overlapping region achieves particularly excellent glitter and gas resistance.

In the ink jet recording method, it is preferable that the method further include applying a clear ink that contains substantially no coloring materials to the first region after the second image is formed.

In this manner, the ink jet recording method can record (produce) images that have excellent gas resistance and particularly excellent friction resistance.

In the ink jet recording method, it is preferable that the glitter ink contain water at not less than 50% by mass.

In this manner, the ink jet recording method can record (produce) images having excellent glitter and gas resistance more effectively.

A record according to another aspect of the invention is recorded by the ink jet recording method according to the above aspect of the invention.

The record according to this aspect contains an image that has excellent glitter and gas resistance.

BRIEF DESCRIPTION OF THE DRAWINGS

The invention will be described with reference to the accompanying drawing.

DESCRIPTION OF EXEMPLARY EMBODIMENTS

Preferred embodiments of the invention will be described in detail below.

Ink Jet Apparatuses

Prior to describing ink jet recording methods according to an aspect of the invention, there will be described preferred embodiments of ink jet apparatuses (liquid droplet ejecting apparatuses) used in the ink jet recording methods.

FIGURE is a perspective view that illustrates a schematic structure of an ink jet apparatus according to an embodiment of the invention.

Figure 1:
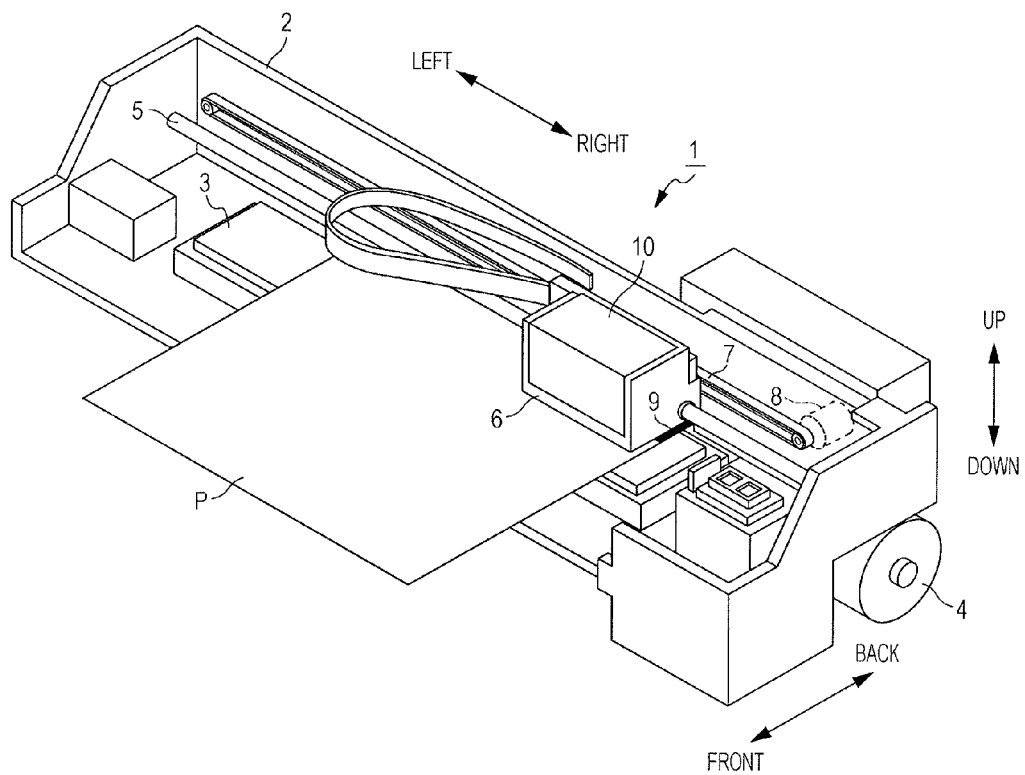
FIG. 1 is a perspective view that illustrates a schematic structure of an ink jet apparatus.

As illustrated in FIG. 1, an ink jet printer 1 (hereinafter, referred to as printer 1) that is a recording apparatus has a frame 2. The frame 2 has a platen 3, on which a recording medium P is transported by driving of a recording medium transporting motor 4. The frame 2 also has a rod-shaped guide member 5 that extends parallel to the longitudinal direction of the platen 3.

The guide member 5 supports a carriage 6 in a manner such that the carriage 6 can reciprocate in the axis direction of the guide member 5. The carriage 6 is connected to a carriage motor 8 via a timing belt 7 that is provided in the frame 2. The carriage 6 is configured to be reciprocatable along the guide member 5 by driving of the carriage motor 8.

The carriage 6 has a head 9. Further, an ink cartridge 10 for supplying a liquid ink to the head 9 is detachably provided in the carriage 6. Driving of a piezoelectric element (not shown) provided in the head 9 causes the ink in the ink cartridge 10 to be supplied from the ink cartridge 10 to the head 9 and to be ejected through a plurality of nozzles formed in a nozzle-forming surface of the head 9 toward the recording medium P that has been transported on the platen 3, thereby producing a record.

The ejection method may be a thermal jet (bubble jet (registered trademark)) method. Alternatively, any known methods may be used.

Ink Jet Recording Methods

Next, preferred embodiments of the ink jet recording methods according to an aspect of the invention will be described.

According to the ink jet recording method of the invention, an image is recorded on a recording medium by applying onto the recording medium a glitter ink in which a glitter pigment is dispersed, and a color ink which contains a coloring material.

The ink jet recording method according to an embodiment includes forming a first image by applying by an ink jet method a glitter ink to a first region on a recording medium in which the glitter first image is to be formed, and forming a second image by applying by an ink jet method a color ink containing a coloring material to a second region of the recording medium in which the colored second image is to be formed.

In the invention, the amount per unit area of the glitter ink ejected in an overlapping region in which the first region overlaps the second region is smaller than the amount per unit area of the glitter ink ejected in the first region excluding the overlapping region.

Images that are recorded using a glitter ink (metallic images) show metallic glossiness immediately after being printed. However, the images become discolored and the glitter (glossiness) decreases more quickly than images produced using general color inks. A possible remedy to prevent such a decrease in glossiness is for a glitter ink to contain additives that are effective in preventing the discoloration of glitter pigments, such as discoloration inhibitors and UV absorbers. However, some of the discoloration inhibitors are not desirable from the viewpoints of safety and environmental friendliness. Further, some additives can cause marked changes in properties of the ink in a short time. Furthermore, many of the additives do not produce desired effects.

The inventors of this invention have found that the degradations described above tend to be severer with decreasing amounts of a glitter pigment that is contained in a unit area of an image, and provided that images are produced using the same glitter ink, the degradations are reduced with increasing amounts of ink dots per unit area. Further, it has been found that increasing the amount of ink dots per unit area or increasing the content of a glitter pigment in a glitter ink is effective in order to obtain higher gas resistance using a glitter ink alone.

Images having both glossiness and color (color tone) (hereinafter, referred to as color metallic images) are produced at times using a glitter ink and a color ink simultaneously. The color metallic images can be formed by ejecting a metallic ink and a color ink at the same time. However, this method results in low glossiness. Thus, a frequently used recording method is to form a metallic image with a glitter ink and to apply a color ink on the metallic image after a time interval. In this case, it has been found that the color ink layer that is printed over the metallic image protects the glitter pigment with the result that the prints are more resistant to degradations compared to prints produced with a silver ink alone.

When the amount of ink dots per unit area is increased, simultaneous ejection of a glitter ink and a color ink results in overflowing or bleeding of the glitter ink, leading to low image quality. Further, the consumption of the glitter ink is increased. To avoid these problems, it is conceivable to increase the drying time after an image is produced with a glitter ink and to apply a color ink after the glitter image is appropriately dried. However, this leads to an increase of the printing time. Similar effects can be obtained by increasing the content of a glitter pigment in a glitter ink. However, the cost of such an ink becomes very high.

The inventors of this invention carried out studies on the basis of the above findings. As a result, they have found that images having excellent glitter and gas resistance can be recorded (produced) in a manner such that the amount per unit area of a glitter ink ejected in the overlapping region in which the first region and the second region overlap with each other is smaller than the amount per unit area of the glitter ink ejected in the first region excluding the overlapping region. The invention has been completed based on that finding.

Steps that are performed in the invention will be described below.

Step of Forming First Image

Figure 2:
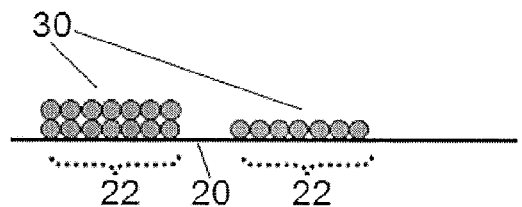
FIG. 2 is a schematic illustration of a first image formed on a recording medium.

In this step (a step of forming a first image, illustrated in FIG. 2), a first image 30 is formed in a first region 22 on a recording medium 20 by applying a glitter ink with use of an ink jet apparatus as described above to the first region 22 of the recording medium 20 in which the glitter first image 30 is to be formed.

Figure 4:
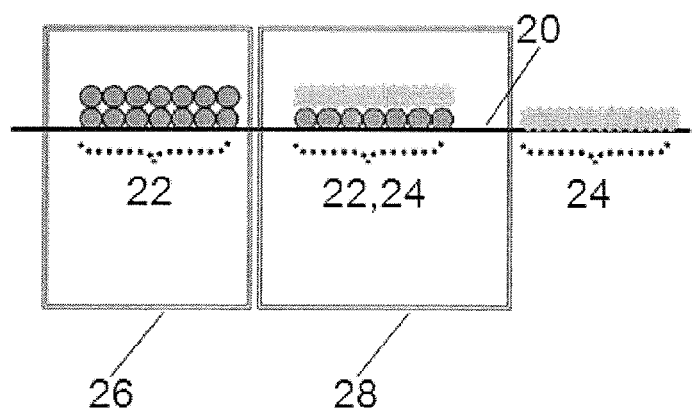
FIG. 4 is a schematic illustration of both the first image of FIG. 2 and the second image of FIG. 3 formed on a recording medium.

In this step, the amount per unit area of the glitter ink ejected in an overlapping region 28 (FIG. 4) in which the first region 22 overlaps a second region 24 described later in which a color image (a second image 24) is to be formed, is smaller than the amount per unit area of the glitter ink ejected in a first region excluding the overlapping region 26. In this manner, it is possible to prevent the decrease in glitter of the whole image including the portion of the image in the overlapping region 28, as well as to achieve excellent gas resistance for the whole image. Further, the usage amount of the glitter ink can be reduced. Furthermore, under specific recording conditions, the difference in the rate of degradation with time (in particular, change in glitter due to ozone gas) can be reduced between the overlapping region 28 and the first region excluding the overlapping region 26.

In detail, it is preferable that the relationship $1.00 < X/Y \leq 3.00$, more preferably the relationship $1.20 \leq X/Y \leq 2.00$ be satisfied wherein X is the amount [%] of the glitter ink ejected in the first region excluding the overlapping region 26 that is calculated as duty by Equation (1) below, and Y is the amount [%] of the glitter ink ejected in the overlapping region 28 that is calculated as duty by Equation (1) below. In this manner, it is possible to prevent more effectively the decrease in glitter of the whole image including the portion of the image in the overlapping region 28, as well as to achieve particularly excellent gas resistance for the whole image.

$$\text{duty}(\%) = \text{number of actual recording dots}/(\text{vertical resolution} \times \text{horizontal resolution}) \times 100 \quad (1)$$

(In Equation (1), "number of actual recording dots" refers to the number of actual recording dots per unit length, and "vertical resolution" and "horizontal resolution" each refer to the resolution per unit length.)

It is preferable that the duty calculated by Equation (1) of the glitter ink in the first region excluding the overlapping region 26 be 30% to 100%, and more preferably 35% to 80%. In this manner, the image produced in the first region excluding the overlapping region 26 achieves particularly excellent glitter and gas resistance.

It is preferable that the duty calculated by Equation (1) of the glitter ink in the overlapping region 28 be 20% to 80%, and more preferably 30% to 70%. In this manner, the image produced in the overlapping region 28 achieves particularly excellent glitter and gas resistance.

The amount of the glitter ink ejected in the overlapping region 28 may be varied in accordance with the kind of the coloring material contained in the color ink described later. In this manner, images having excellent glitter and gas resistance as well as high color properties can be recorded (produced).

Recording Media

The recording media are not particularly limited. Examples thereof include various kinds of paper, cloth, films and sheets.

Glitter Inks

The glitter ink contains a glitter pigment. Any glitter pigments may be used as long as the glitter ink containing the pigment can be ejected as droplets by the ink jet recording method. The glitter pigment provides glitter when the glitter ink is attached onto a resin ink layer, and adds glitter to an object that is attached thereto.

Examples of the glitter pigments include pearl pigments and metal particles. Typical examples of the pearl pigments include pearlescent pigments and interference pigments such as titanium dioxide-coated mica, argentine and bismuth oxychloride. Examples of the metal particles include particles of metals such as aluminum, silver, gold, platinum, nickel, chromium, tin, zinc, indium, titanium and copper. The metal particles may be particles of at least one of these metals, alloys thereof and mixtures of these metals and alloys.

From the viewpoint of high glossiness (glitter), the glitter pigment used in this embodiment is preferably silver particles. Hereinbelow, a silver ink will be described as a specific example of the glitter ink.

1. Silver Particles

As described above, the silver ink in this embodiment contains silver particles. The silver ink containing silver particles (in particular together with a wax that satisfies specific conditions) can form images showing excellent metallic glossiness. Because silver has a high whiteness among other metals, the silver ink can produce various metallic colors such as gold color and bronze color by overlapping or by being overlapped by an ink of differing color.

The average particle diameter of the silver particles is preferably 3 nm to 100 nm, and more preferably 20 nm to 65 nm. This average particle diameter ensures that the silver ink produces images having particularly excellent glossiness (glitter) and friction resistance. The average particle diameter in the above range also enables achieving of particularly excellent ejection stability (for example, landing accuracy and stability of ejection amount) in an ink jet system. Thus, images of desired quality can be produced more reliably over the long term. In this specification, the term "average particle diameter" refers to a volume average particle diameter unless otherwise mentioned. The average particle diameter may be measured with a particle size distribution analyzer based on a laser diffraction scattering method. An exemplary laser diffraction particle size distribution analyzer is a particle size distribution analyzer based on a dynamic light scattering method (for example, MICROTRACK UPA manufactured by NIKKISO CO., LTD.).

The content of the silver particles in the silver ink is preferably 0.5% to 30% by mass, and more preferably 5.0% to 15% by mass. This content ensures that the ink achieves particularly excellent ejection stability in an ink jet system as well as particularly excellent storage stability. Further, the silver ink having the above content of the silver particles can provide a record which has good image quality and high friction resistance over a wide range of values of the density (the content per unit area) of the silver particles on the recording medium.

The silver particles may be prepared by any methods. In a preferred method, a solution containing silver ions may be provided and the silver ions may be reduced.

2. Resins

The glitter ink according to the invention may contain a resin. The use of a resin improves fixation and friction resistance of the image. Examples of the resins include but are not limited to polyacrylic acids, polymethacrylic acids, polymethacrylates, polyethylacrylic acids, styrene/butadiene copolymers, polybutadienes, acrylonitrile/butadiene copolymers, chloroprene copolymers, fluororesins, vinylidene fluorides, polyolefin resins, celluloses, styrene/acrylic acid copolymers, styrene/methacrylic acid copolymers, polystyrenes, styrene/acrylamide copolymers, polyisobutyl acrylates, polyacrylonitriles, polyvinyl acetates, polyvinylacetals, polyamides, rosin resins, polyethylenes, polycarbonates, vinylidene chloride resins, cellulose resins such as cellulose acetate butyrate, vinyl acetate resins, ethylene/vinyl acetate copolymers, vinyl acetate/acrylic copolymers, vinyl chloride resins, polyurethanes and rosin esters.

3. Water

The glitter ink according to the invention may be an aqueous ink containing water at not less than 50% by mass, or may be a non-aqueous ink containing water at less than 50% by mass.

When the glitter ink is an aqueous ink containing water at not less than 50% by mass, the dispersibility of the silver particles is improved and the silver particles can be effectively arranged or arrayed over the surface of the produced image. As a result, images having excellent glitter and gas resistance can be recorded (produced) more effectively.

When the ink contains water, the water mainly functions as a dispersion medium for dispersing the silver particles and wax particles. The water contained in the ink permits the particles such as the silver particles to be dispersed stably. Further, the water allows for quick drying of the ink applied on the recording medium while preventing undesired drying (the evaporation of the dispersion medium) of the ink in the vicinity of the nozzles of a liquid droplet ejecting apparatus that will be described later. Consequently, desired images can be recorded at high speed favorably over the long term. When the ink contains water, the content of water is not particularly limited, but is preferably 20% to 80% by mass, and more preferably 25% to 70% by mass.

4. Polyhydric Alcohols

The glitter ink according to the invention preferably contains a polyhydric alcohol. The polyhydric alcohol suppresses the drying of the ink when the ink in this embodiment is used in an ink jet recording apparatus, and prevents the clogging of the ink jet recording head by the ink.

Examples of the polyhydric alcohols include ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, trimethylolpropane, 1,2-butanediol, 1,2-pentanediol, 1,2-hexanediol, 1,2-heptanediol and 1,2-octanediol. In particular, alkane diols having 4 to 8 carbon atoms are preferable, and alkane diols of 6 to 8 carbon atoms are more preferable. The use of such a polyhydric alcohol results in particularly high penetration properties into the recording medium. The content of the polyhydric alcohol in the ink is not particularly limited, but is preferably 0.1% to 20% by mass, and more preferably 0.5% to 10% by mass.

Among the above polyhydric alcohols, the ink preferably contains 1,2-hexanediol and trimethylolpropane. When the ink contains such polyhydric alcohols, the silver particles achieve particularly excellent dispersion stability and the ink shows particularly excellent storage stability as well as particularly excellent ejection stability.

5. Glycol Ethers

The glitter ink according to the invention preferably contains a glycol ether. The ink containing a glycol ether shows higher wetting properties with respect to the recording surface of the recording medium, and thereby achieves higher penetration properties.

Examples of the glycol ethers include lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether and tripropylene glycol monomethyl ether. Among these, the use of triethylene glycol monobutyl ether results in good image quality. The content of the glycol ether in the ink is not particularly limited, but is preferably 0.2% to 20% by mass, and more preferably 0.3% to 10% by mass.

6. Surfactants

The glitter ink according to the invention preferably contains an acetylene glycol surfactant or a polysiloxane surfactant. The acetylene glycol surfactant or the polysiloxane surfactant increases wetting properties with respect to the recording surface of the recording medium, and thereby achieves higher penetration properties of the ink.

Examples of the acetylene glycol surfactants include 2,4,7,9-tetramethyl-5-decyne-4,7-diol, 3,6-dimethyl-4-octyne-3,6-diol, 3,5-dimethyl-1-hexyn-3-ol and 2,4-dimethyl-5-hexyn-3-ol. Commercial acetylene glycol surfactants may be used, with examples including Olfine E1010 STG and Y (manufactured by Nissin Chemical Co., Ltd.) and SURFYNOL 104, 82, 465, 485 and TG (manufactured by Air Products and Chemicals Inc.).

Commercial polysiloxane surfactants may be used, with examples including BYK-347 and BYK-348 (manufactured by BYK Japan K.K.).

The ink according to the invention may contain other surfactants such as anionic surfactants, nonionic surfactants and amphoteric surfactants.

The content of the surfactant in the glitter ink is not particularly limited, but is preferably 0.01% to 5.0% by mass, and more preferably 0.1% to 1.5% by mass.

7. Other Components

The glitter ink according to the invention may contain components (other components) other than those described above. Examples of such components include pH adjusters, penetrating agents, organic binders, drying inhibitors such as urea compounds and alkanolamines (such as triethanolamine), and thiourea.

Step of Forming Second Image

Figure 3:
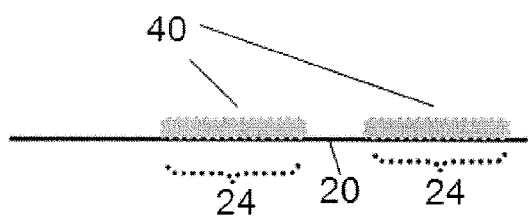
FIG. 3 is a schematic illustration of a second image formed on a recording medium.

In this step (a step of forming a second image, illustrated in FIG. 3), a second image 40 is formed by applying by an ink jet method a color ink to a second region 24 on the recording medium 20 in which the colored second image 40 is to be formed, thereby producing a record according to the invention.

The amount of the color ink ejected in the second region 24 is not particularly limited. However, it is preferable that the duty calculated by Equation (1) of the color ink in the overlapping region 28 in which the second region 24 overlaps the first region 22 be 10% to 100%, and more preferably 20% to 80%. In this manner, images having particularly excellent color properties and gas resistance can be formed without deteriorating the excellent glitter.

Color Inks

The color ink contains a coloring material. Examples of the color inks include cyan ink, magenta ink, yellow ink, light cyan ink, light magenta ink, dark yellow ink, red ink, green ink, blue ink, orange ink, violet ink, black ink and light black ink.

Examples of the coloring materials include pigments and dyes. Any coloring materials used in usual inks may be used without limitation.

The pigments used in this embodiment are not particularly limited, and various known pigments may be used.

Examples of organic yellow pigments include C. I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172 and 180.

Examples of organic magenta pigments include C. I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224 and 245, and C. I. pigment violet 19, 23, 32, 33, 36, 38, 43 and 50.

Examples of organic cyan pigments include C. I. pigment blue 1, 2, 3, 15, 15:1, 15:2, 15:3, 15:4, 15:6, 15:34, 16, 18, 22, 25, 60, 65 and 66, and C. I. vat blue 4 and 60.

Examples of organic pigments other than the magenta, cyan and yellow pigments include C. I. pigment green 7 and 10, C. I. pigment brown 3, 5, 25 and 26, and C. I. pigment orange 2, 5, 7, 13, 14, 15, 16, 24, 34, 36, 38, 40, 43 and 63.

The pigment preferably has an average particle diameter of about 10 nm to 200 nm, and more preferably about 50 nm to 150 nm. The addition amount of the pigment in this embodiment is preferably about 1% to 25% by mass, and more preferably about 3% to 20% by mass.

Examples of the dyes which can be used in this embodiment include acridine dyes, aniline dyes, anthraquinone dyes, azine dyes, azomethine dyes, benzoquinone dyes, naphthoquinone dyes, indigoid dyes, indophenol dyes, indoaniline dyes, indamine dyes, leuco dyes, naphthalimide dyes, nigrosine dyes, induline dyes, nitro dyes, nitroso dyes, oxazine dyes, dioxazine dyes, oxidation dyes, phthalocyanine dyes, polymethine dyes, quinophthalone dyes, sulfide dyes, triacrylmethane dyes, diacrylmethane dyes, thiazine dyes, thiazole dyes, xanthene dyes and cyanine dyes.

Specific examples of yellow dyes include C. I. acid yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164 and 165, C. I. direct yellow 1, 8, 11, 12, 24, 26, 27, 33, 39, 44, 50, 58, 85, 86, 87, 88, 89, 98, 110, 132, 142 and 144, C. I. reactive yellow 1, 2, 3, 4, 6, 7, 11, 12, 13, 14, 15, 16, 17, 18, 22, 23, 24, 25, 26, 27, 37 and 42, C. I. food yellow 3 and 4, and C. I. solvent yellow 15, 19, 21, 30 and 109.

Specific examples of magenta dyes include C. I. acid red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321 and 322, C. I. direct red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231, C. I. reactive red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63 and 64, C. I. solubilized red 1, and C. I. food red 7, 9 and 14.

Specific examples of cyan dyes include C. I. acid blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236 and 249, C. I. direct blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248 and 249, C. I. reactive blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46, C. I. solubilized vat blue 1, 5 and 41, C. I. vat blue 4, 29 and 60, C. I. food blue 1 and 2, and C. I. basic blue 9, 25, 28, 29 and 44.

Examples of the dyes of other colors include C. I. acid green 7, 12, 25, 27, 35, 36, 40, 43, 44, 65 and 79, C. I. direct green 1, 6, 8, 26, 28, 30, 31, 37, 59, 63 and 64, C. I. reactive green 6 and 7, C. I. acid violet 15, 43, 66, 78 and 106, C. I. direct violet 2, 48, 63 and 90, and C. I. reactive violet 1, 5, 9 and 10.

One or more dyes may be selected from any group of the dyes of the same color as well as from the groups of the dyes of differing colors.

The addition amount of the dye in this embodiment is preferably about 1% to 25% by mass, and more preferably about 3% to 20% by mass.

The color ink preferably contains a resin component. When the color ink contains a resin component, the second image increases adhesion with respect to the recording medium.

Examples of the resin components include but are not limited to polyacrylic acids, polymethacrylic acids, polymethacrylates, polyethylacrylic acids, styrene/butadiene copolymers, polybutadienes, acrylonitrile/butadiene copolymers, chloroprene copolymers, fluororesins, vinylidene fluorides, polyolefin resins, celluloses, styrene/acrylic acid copolymers, styrene/methacrylic acid copolymers, polystyrenes, styrene/acrylamide copolymers, polyisobutyl acrylates, polyacrylonitriles, polyvinyl acetates, polyvinylacetals, polyamides, rosin resins, polyethylenes, polycarbonates, vinylidene chloride resins, cellulose resins such as cellulose acetate butyrate, vinyl acetate resins, ethylene/vinyl acetate copolymers, vinyl acetate/acrylic copolymers, vinyl chloride resins, polyurethanes and rosin esters.

The content of the resin component in the color ink is preferably 0.1% to 10% by mass, and more preferably 0.5% to 5% by mass. This content ensures that a second image having excellent coloring properties can be produced more effectively. When the color ink contains the resin component, the gas resistance of the ink is further improved.

After the second image is formed, a clear ink that contains substantially no coloring materials may be applied to the first region. By performing this clear ink application step, the gas resistance in the overlapping region and the first region excluding the overlapping region can be increased without substantially changing the color of the image, and the obtainable image achieves particularly excellent friction resistance. Further, under the specific recording conditions, the difference in the rate of degradation of glitter with time (in particular due to ozone gas) between the overlapping region and the first region excluding the overlapping region can be reduced without substantially changing the color of the image. The phrase "contains substantially no coloring materials" means that the content of coloring materials in the clear ink is less than 0.01% by mass, and preferably less than 0.05% by mass.

The clear ink preferably contains the above-described resin component at 0.1% to 20% by mass, and more preferably 0.5% to 10% by mass. When the clear ink contains the resin component, the gas resistance of the ink is further improved.

The preferred embodiments of the invention described hereinabove are only explanatory and do not limit the scope of the invention.

EXAMPLES

Examples according to the invention will be described below.

1. Preparation of Glitter Ink

Polyvinylpyrrolidone (PVP, weight average molecular weight 10000) was heated at 70° C. for 15 hours and was thereafter cooled at room temperature. This PVP weighing 1000 g was added to 500 ml of an ethylene glycol solution to give a PVP solution. Separately, 500 ml of ethylene glycol was added to a container, and 128 g of silver nitrate was added thereto. The mixture was sufficiently stirred with an electromagnetic stirrer to give a silver nitrate solution. While the PVP solution was stirred at 120° C. using an overhead mixer, the silver nitrate solution was added. The mixture was heated for about 80 minutes to perform the reaction. Thereafter, the reaction solution was cooled at room temperature and was centrifuged at 2200 rpm for 10 minutes. The separated silver particles were collected and added to 500 ml of an ethanol solution to remove the extra PVP. The mixture was further centrifuged and the silver particles were collected. The silver particles were then dried in a vacuum drier at 35° C. and 1.3 Pa.

A glitter ink was prepared by mixing 10% by mass of the silver particles produced above, 3% by mass of 1,2-hexanediol, 0.3% by mass of triethanolamine, 15% by mass of trimethylolpropane, 1% by mass of a nonionic surfactant (Olfine® E1010 manufactured by Nissin Chemical Co., Ltd.), and an amount of ion exchange water for adjusting the concentration.

2. Color Inks

The following color inks were used.

Cyan ink (ICC37 manufactured by SEIKO EPSON CORPORATION)

Magenta ink (ICM37 manufactured by SEIKO EPSON CORPORATION)

Yellow ink (ICY37 manufactured by SEIKO EPSON CORPORATION)

3. Preparation of Clear Ink

A clear ink was prepared by mixing 3% by mass of 1,2-hexanediol, 15% by mass of trimethylolpropane, 10% by mass of a resin (JONCRYL® 62 manufactured by BASF), 1% by mass of a nonionic surfactant (Olfine® E1010 manufactured by Nissin Chemical Co., Ltd.), 0.3% by mass of a pH adjuster (triethanolamine), and a balance of ion exchange water.

4. Production of Record

Examples 1 to 10, Comparative Example 1, and Reference Examples 1 to 4

The glitter ink and the color inks were loaded into cartridges that were exclusive for ink jet printer PX-G930 manufactured by SEIKO EPSON CORPORATION.

Next, commercial gloss paper (glossy photo paper manufactured by SEIKO EPSON CORPORATION) was set in the printer.

A first image was formed in a first region on the glossy paper with the glitter ink.

Subsequently, a second image was formed in a second region on the glossy paper with the color ink.

In an overlapping region in which the first region and the second region overlapped with each other, the glitter ink was applied at a duty (%) shown in Tables 1 and 2. In the first region excluding the overlapping region, the glitter ink was applied at a duty (%) shown in Table 1. The color ink was applied at a duty shown in Tables 1 and 2.

In Example 10, the clear ink was applied at a duty of 30% to the first region excluding the overlapping region after the second image was produced.

TABLE 1

| | Color ink | Duty (X) [%] of glitter ink in other than overlapping region | Duty (Y) [%] of glitter ink in overlapping region | Duty [%] of color ink | Duty [%] of clear ink | X/Y |
|---|---|---|---|---|---|---|
| Ex. 1 | Cyan | 100 | 70 | 50 | — | 1.43 |
| Ex. 2 | Cyan | 100 | 70 | 90 | — | 1.43 |
| Ex. 3 | Cyan | 100 | 50 | 90 | — | 2.00 |
| Ex. 4 | Cyan | 70 | 50 | 50 | — | 1.40 |
| Ex. 5 | Cyan | 70 | 50 | 90 | — | 1.40 |
| Ex. 6 | Cyan | 50 | 20 | 50 | — | 2.50 |
| Ex. 7 | Cyan | 50 | 20 | 70 | — | 2.50 |
| Ex. 8 | Magenta | 70 | 50 | 50 | — | 1.40 |
| Ex. 9 | Magenta | 70 | 50 | 90 | — | 1.40 |
| Ex. 10 | Clear | 70 | 50 | — | 30 | — |
| Comp. Ex. 1 | Cyan | 50 | 50 | 50 | — | 1.00 |

TABLE 2

| | Color ink | Duty [%] of glitter ink in overlapping region | Duty [%] of color ink | Glossiness |
|---|---|---|---|---|
| Ref. Ex. 1 | Cyan | 30 | 50 | 100.2 |
| Ref. Ex. 2 | Cyan | 40 | 50 | 111.4 |
| Ref. Ex. 3 | Cyan | 50 | 50 | 109.7 |
| Ref. Ex. 4 | Cyan | 60 | 50 | 109.4 |

5. Evaluation of Gas Resistance

The records obtained in Examples and Comparative Example were tested to evaluate the gas resistance using ozone weather meter OMS-H (product name, manufactured by Suga Test Instruments Co., Ltd.) at a temperature of 23.0° C., a humidity of 50% RH and an ozone concentration of 40 ppm. The ozone exposure time was 2 hours.

The specular glossiness at 60° was measured with respect to the overlapping region and the first region excluding the overlapping region using MULTI GLOSS 268 GLOSS METER (product name, manufactured by KONICA MINOLTA HOLDINGS, INC.) before and after the record was exposed to ozone, thereby determining the decrease in the glossiness due to the ozone exposure. The gas resistance was evaluated based on the following criteria.

A: The decrease was less than 10%.
B: The decrease was 10% to less than 25%.
C: The decrease was 25% to less than 40%.
D: The decrease was 40% or more.

6. Evaluation of Glossiness at 60°

The records obtained in Examples and Comparative Example were tested to evaluate the glossiness at a tilt angle of 60° with respect to the overlapping region and the first region excluding the overlapping region using MULTI GLOSS 268 GLOSS METER (manufactured by KONICA MINOLTA HOLDINGS, INC).

The results are described in Tables 2 and 3.

TABLE 3

| | Evaluation of gas resistance | | | |
| --- | --- | --- | --- | --- |
| | Other than overlapping region | | Overlapping region | |
| | Decrease (%) | Evaluation | Decrease (%) | Evaluation |
| Ex. 1 | 7.8 | A | 13.5 | B |
| Ex. 2 | 7.8 | A | 8.3 | A |
| Ex. 3 | 7.8 | A | 15.9 | B |
| Ex. 4 | 15.6 | B | 24.1 | B |
| Ex. 5 | 15.6 | B | 15.9 | B |
| Ex. 6 | 34.7 | C | 32.2 | C |
| Ex. 7 | 34.7 | C | 29.2 | C |
| Ex. 8 | 15.6 | B | 22.7 | B |
| Ex. 9 | 15.6 | B | 10.6 | B |
| Ex. 10 | 15.6 | B | 4.2 | A |
| Comp. Ex. 1 | 34.7 | C | 24.1 | B |

As shown in Table 3, the images recorded (produced) by the ink jet recording method according to the invention achieved excellent glitter and gas resistance. In contract, the results obtained in Comparative Example 1 were not satisfactory.

What is claimed is:

1. An ink jet recording method which comprises:
    forming a first image by applying by an ink jet method a glitter ink in which a glitter pigment is dispersed to a first region of a recording medium in which the glitter first image is to be formed, and
    forming a second image by applying by an ink jet method a color ink containing a coloring material to a second region of the recording medium in which the colored second image is to be formed,
    a volume per unit area of the glitter ink ejected in an overlapping region in which the first region overlaps the second region being smaller than the a volume per unit area of the glitter ink ejected in the first region excluding the overlapping region.

2. The ink jet recording method according to claim 1, wherein the volume of the glitter ink ejected in the overlapping region is varied in accordance with the kind of the coloring material in the color ink.

3. A recording apparatus which performs the ink jet recording method described in claim 2.

4. A record which is recorded by the ink jet recording method described in claim 2.

5. The ink jet recording method according to claim 1, wherein the relationship 1.00<X/Y≤3.00 is satisfied wherein X is the volume [%] of the glitter ink ejected in the first region excluding the overlapping region that is calculated as duty by Equation (1) below, and Y is the amount volume [%] of the glitter ink ejected in the overlapping region that is calculated as duty by Equation (1) below:

duty (%)=number of actual recording dots/(vertical resolution×horizontal resolution)×100

(wherein in Equation (1), "number of actual recording dots" refers to a number of actual recording dots per unit length, and "vertical resolution" and "horizontal resolution" each refer to a resolution per unit length).

6. The ink jet recording method according to claim 5, wherein X is 30% to 100%.

7. A recording apparatus which performs the ink jet recording method described in claim 6.

8. A record which is recorded by the ink jet recording method described in claim 6.

9. The ink jet recording method according to claim 5, wherein Y is 20% to 80%.

10. A recording apparatus which performs the ink jet recording method described in claim 9.

11. A record which is recorded by the ink jet recording method described in claim 9.

12. A recording apparatus which performs the ink jet recording method described in claim 5.

13. A record which is recorded by the ink jet recording method described in claim 5.

14. The ink jet recording method according to claim 1, wherein the method further comprises applying a clear ink that contains substantially no coloring materials to the first region after the second image is formed.

15. A recording apparatus which performs the ink jet recording method described in claim 14.

16. A record which is recorded by the ink jet recording method described in claim 14.

17. The ink jet recording method according to claim 1, wherein the glitter ink contains water at not less than 50% by mass.

18. A recording apparatus which performs the ink jet recording method described in claim 7.

19. A recording apparatus which performs the ink jet recording method described in claim 1.

20. A record which is recorded by the ink jet recording method described in claim 1.

* * * * *